Oct. 21, 1952     C. B. RICHEY     2,614,440
BELT DRIVE FOR SMALL DIAMETER ADJACENT CYLINDERS
Filed June 26, 1951
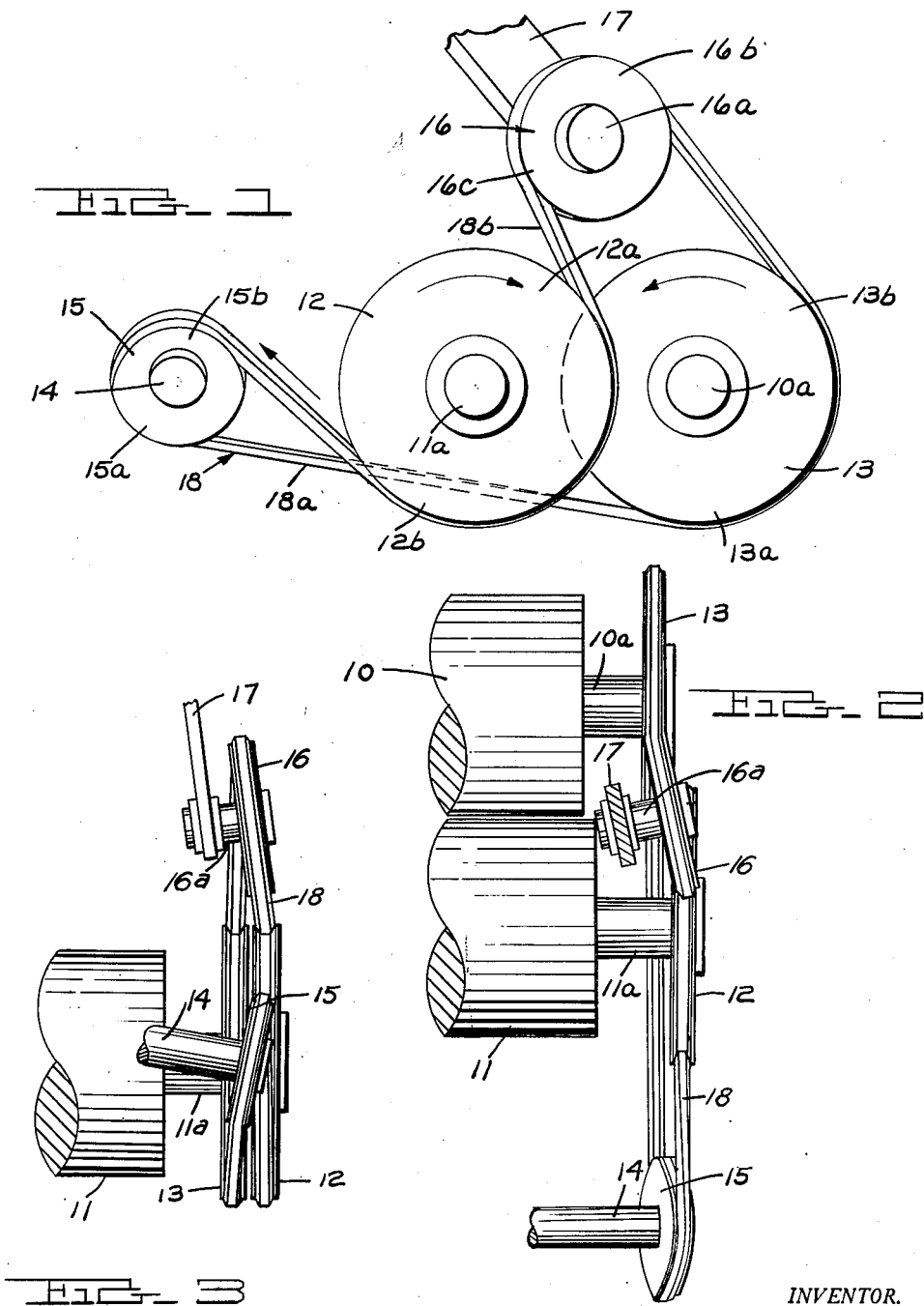
INVENTOR.
CLARENCE B. RICHEY
BY
*W. A. Schaich*
ATTORNEY Patented Oct. 21, 1952

2,614,440

UNITED STATES PATENT OFFICE 2,614,440

BELT DRIVE FOR SMALL DIAMETER ADJACENT CYLINDERS

Clarence B. Richey, Royal Oak, Mich., assignor to Dearborn Motors Corporation, Birmingham, Mich., a corporation of Delaware Application June 26, 1951, Serial No. 233,633

4 Claims. (Cl. 74—722)

This invention relates to a belt drive for small diameter rolls or cylinders arranged in side by side, generally parallel relationship.

Belt drives for driving various elements of a machine constitute a convenient and generally economical way of effecting the transmission of power to such elements. A serious drawback with any belt drive is that the diameter of the pulley must be maintained above a certain minimum; otherwise the belt will be subjected to abnormal stresses resulting in rapid breakdown of the belt. A further disadvantage of small diameter pulleys is that slippage of the belt on the pulley is hard to avoid.

In certain drive applications in farm machinery where a pair of adjacent rolls must be driven in oppositely rotating directions, it has been quite a problem to utilize a belt drive for such rolls which will produce the required torque in the adjacent cylinders or rolls to meet the service requirements. Some farm implements, such as cotton strippers, corn pickers or hay crushers, generally utilize a pair of adjacent rolls of relatively small diameter, relative to their length, for harvesting or otherwise treating the crop. Heretofore it has been necessary to utilize a relatively expensive gear train for driving such rolls.

It is, therefore, an object of this invention to provide an improved belt drive for a pair of small diameter rolls arranged in side by side relationship.

Another object of this invention is to provide an improved belt drive for a pair of adjacent substantially parallel small diameter rolls which not only substantially eliminates belt slippage but also rotates the rolls in opposite directions.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a front view showing the improved driving arrangement constructed in accordance with this invention.

Figure 2 is a plan view of Figure 1.

Figure 3 is a left end view of Figure 1.

As shown on the drawings:

In Figure 2 of the appended drawing, there is shown a pair of adjacent rolls 10 and 11 which are disposed in generally parallel relationship. Rolls 10 and 11 are only shown schematically and may represent the snapping rolls of a corn picker, the crushing rolls of a hay crusher or the stripping brushes of a cotton stripping machine. Rolls 10 and 11 are respectively provided with axial shafts 10a and 11a which project somewhat beyond the right hand end of rolls 10 and 11, as best shown in Figure 2. Shaft 11a projects somewhat beyond the end of shaft 10a so that a pulley 12 secured to the end of shaft 11a overlaps an identical pulley 13 secured to the end of shaft 10a as best shown in Figures 1 and 2. Due to the relatively small diameter of rolls 10 and 11, and to the requirement for the close side by side arrangement of such rolls in order for them to function properly, the overlapped arrangement of pulleys 12 and 13 permits the use of sufficiently large diameter pulleys to provide substantial belt engagement with the peripheries of such pulleys so that a desired torque will be imparted to the rolls 10 and 11 for the particular operation such rolls are required to perform.

A power input or drive shaft 14 has a drive pulley 15 secured to its end. Shaft 14, and hence pulley 15, are disposed adjacent the left hand side of pulley 12 as shown in Figure 1. The shaft 14, however, has its axis skewed relative to the axes of rolls 10 and 11 as best shown in Figures 2 and 3; thus pulley 15 is cocked so that the upper and lower edges thereof (as viewed in Figures 2 and 3) are substantially aligned respectively with the edges of overlapping pulleys 12 and 13 for a purpose to presently appear. An idler pulley 16, which also serves to tension and direct a belt 18 is rotatably mounted by a stub shaft 16a on a depending arm 17. Arm 17 is adjustably mounted for vertical movement on the implement (not shown) whereby the pulley may be vertically moved for tensioning of the belt 18. The vertical axis of pulley 16 is preferably located midway between the pulleys 12 and 13 as best shown in Figure 1, and such pulley is positioned above pulleys 12 and 13. The stub shaft axis is likewise skewed relative to the axes of rolls 10 and 11 to respectively align its front and rear edges with pulleys 12 and 13, as best shown in Figure 2.

All of the pulleys above described are respectively provided with peripheral grooves of generally V-shaped configuration to receive a V-shaped rubber belt 18. Belt 18, however, is of the so-called double V type thereby defining a substantially hexagonal cross sectional configuration. Belt 18 is trained over the top of driving pulley 15 and has a lower portion 18a departing from the underside of pulley 15. The lower portion 18b of belt 18 surrounds the right hand portion (as viewed in Figure 1) or belt entering portion 13a of pulley 13. Idler pulley 16 has a belt entering portion 16b and belt 18 is directed thereabouts from the belt departing portion 13b of pulley 13, thus providing substantially more than a 90° lap of belt 18 on such pulley. Pulley 12 has a belt entering portion 12a and a belt departing portion 12b, and the upper belt portion 18b is directed around such pulley with the belt 18 respectively entering and leaving the pulley at the points 12a and 12b, thus providing substantially more than a 90° lap of the belt 18 on pulley 12. Belt 18 is then directed over the belt entering portion 15b of drive pulley 15. The belt 18 is properly tensioned by vertically adjusting pulley 16.

Referring to Figure 1, it is obvious that belt 18, as trained over the various pulleys will produce an opposite rotation of the pulleys 12 and 13 whereby the adjacent rolls 10 and 11 will be oppositely rotated. It will be noted that the slight cocking of pulleys 15 and 16, provided by respectively skewing their shafts 14 and 16a, is necessary to align the belt with the edges of pulleys 12 and 13. Figures 2 and 3 best show the cocked arrangement of such pulleys.

Driving pulley 15 may be of relatively small diameter as belt 18 contacts substantially the entire periphery of such pulley, thus eliminating substantially all belt slippage at this point. The relatively large diameter of the overlapping pulleys 12 and 13, and the disposition of pulleys 15 and 16 relative thereto, permit considerable engagement thereof by belt 18. Thus a relatively large torque force may be imparted to rolls 10 and 11 without belt slippage.

From the above description it is clearly apparent that there is here provided an improved belt driving arrangement for relatively small diameter rolls arranged in side by side relationship, which is a more economical and convenient way of effecting driving of the adjacent rolls than gearing arrangements heretofore employed.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A driving arrangement for rotating a pair of adjacent shafts comprising a pair of driven pulleys respectively secured to the shafts in axially spaced relationship, a drive pulley, an idler pulley and a single belt trained over all of said pulleys, said drive pulley being disposed with its belt entering portion generally aligned with the belt departing portion of one of said driven pulleys and with its belt departing portion generally aligned with the belt entering portion of the other of said driven pulleys, said idler pulley being disposed relative to said driven pulleys to provide greater than 90° lap of said belt on each of said driven pulleys, and said idler pulley being inclined relative to said driven pulleys so that the belt entering portion of said idler pulley is substantially aligned with the belt departing portion of said other driven pulley and the belt departing portion of said idler pulley is substantially aligned with the belt entering portion of said one driven pulley.

2. A driving arrangement for rotating a pair of adjacent relatively small diameter, parallel rolls comprising a pair of driven pulleys respectively secured to the rolls in axially spaced relationship, said pulleys being of a larger diameter than the rolls so that said pulleys are in overlapping relationship, a drive pulley, an idler pulley and a single belt trained over all of said pulleys, said drive pulley being disposed with its belt entering portion generally aligned with the belt departing portion of one of said driven pulleys and with its belt departing portion generally aligned with the belt entering portion of the other of said driven pulleys, said idler pulley being disposed relative to said driven pulleys to provide greater than 90° lap of said belt on each of said driven pulleys, and said idler pulley being inclined relative to said driven pulleys so that the belt entering portion of said idler pulley is substantially aligned with the belt departing portion of said other driven pulley and the belt departing portion of said idler pulley is substantially aligned with the belt entering portion of said one driven pulley.

3. The combination defined in claim 1 wherein oppositely moving portions of said belt respectively contact similar sides of said driven pulleys, thereby producing opposite rotation of said shafts.

4. The combination defined in claim 2 wherein oppositely moving portions of said belt respectively contact similar sides of said driven pulleys, thereby producing opposite rotation of said rolls.

CLARENCE B. RICHEY.

REFERENCES CITED

The following references are of record in the file of this patent:

UNITED STATES PATENTS

| Number | Name | Date |
|---|---|---|
| 1,633,920 | Bradford | June 28, 1927 |